3,769,386
PROCESS FOR THE PREPARATION OF ZEOLITIC ALUMINO-METALLO SILICATES
Clark A. Rundell, Silver Spring, and Carl V. McDaniel, Laurel, Md., assignors to W. R. Grace & Co., New York, N.Y.
No Drawing. Continuation-in-part of abandoned application Ser. No. 822,857, May 1, 1969. This application Sept. 23, 1971, Ser. No. 183,264
Int. Cl. C01b 33/28
U.S. Cl. 423—263
9 Claims

ABSTRACT OF THE DISCLOSURE

Zeolitic alumino-metallo silicates are crystallized from an aqueous reaction mixture comprising sources of $Na_2O$, $SiO_2$, $Al_2O_3$ and $R_{2/n}O$, R being a metal, such as magnesium, calcium, yttrium, the rare earths, iron, cobalt, and nickel, and $n$ its valence, introduced into the reaction mixture in the form of a complex. Suitable complexing agents include tartrates, citrates, and ethylene diamine tetraacetates. Nucleation centers are added to the reaction mixture to initiate the reaction. The products have utility as components in catalysts and as adsorbents.

---

This application is a continuation-in-part of application Ser. No. 822,857 filed May 1, 1969, now abandoned.

BACKGROUND OF THE INVENTION

In application Ser. No. 183,265 filed of even date herewith, the preparation of zeolites containing various metal ions is disclosed. The metal is incorporated in the zeolite during synthesis rather than as a subsequent modification of the zeolite composition.

Metals such as the rare earths have been found to impart desirable characteristics to catalysts, particularly hydrocarbon cracking catalysts. These metals, when added to the zeolitic component of the cracking catalyst, improve the thermal stability of the catalyst very markedly.

In the process described in the above-identified application, the metal is derived from a solution of a soluable salt of the metal, such as chloride or nitrate, for example, and is one of the reactants in the crystallization step. The final product, which is crystallized from the metal-containing reaction mixture, has the metal contained within the crystal framework and has the characteristics of the zeolites.

This application is restricted to the preperation of zeolites that can be represented by the general formula:

(a) $M_2O$: (b) $Al_2O_3$:(1-b)$R_{2/n}O$: (c) $SiO_2$: (d) $H_2O$
or
(a) $M_2O$: (a) $Al_2O_3$:(1-b)$R_{2/n}O$: (c) $SiO_2$: (d) $H_2O$ where $m$ is an alkali metal and R is a metal as defined below (a) is about 1.0
(b) from about 0.5 to 0.99
(c) varies from 2.5 to 7.0, and
(d) varies from 5 to 9.

The metals that may be used are selected from the groups as defined in the Manual of Classification published by the U.S. Patent Office. We include the following metals in our group definition: Group I—copper and silver; Group II—magnesium, calcium, barium, zinc and cadmium; Group III—yttrium, and the rare earths. In our definition under rare earths, we include the elements 57 through 71, lanthanium through lutecium. Group IV—hafnium, thorium, tin, and lead; Group V—niobium, tantalum, arsenic and antimony, Group VI—chromium, molybdenum, tungsten, and uranium; Group VII—mangnaese; Group VIII—iron, cobalt, nickel, and the noble metals. In our definition of noble metals we include ruthenium, rhodium, palladium, osmium, iridium, and platinum.

We have found that zeolitic alumino-metallo silicates can be prepared by a process which comprises:

(1) Preparing a sodium hydroxide solution containing the desired metal salt complex dissolved therein. The metal is maintained in soluble form by the presence of a complexing agent such as the tartrate, for example.

(2) Forming a mixture containing the above solution, sodium hydroxide, alumina, and silica. The silica source may be sodium silicate, the alumina source, sodium aluminate.

(3) Adding nucleation centers to the mixture and heating to crystallize the zeolite.

(4) Separating the product by filtration and washing free of excess reactants. The zeolite is then dried and calcined if desired. If the zeolite is to be used as a component of a cracking catalyst, the sodium content of the zeolite is reduced by conventional ion exchange techniques.

Although the above process is preferred, the product can also be prepared using an alternate process. In one embodiment of this process an amorphous silica-alumina component is used to complex the metal ion. The metals are introduced by exchange of the ions into the amorphous silica-alumina composition prior to the cyrstallization step. Although this process gives satisfactory results, for purposes of simplicity, we will limit our discussion to a description of the preferred process for preparing the zeolite.

The first step of the preferred process is the preparation of a sodium hydroxide solution containing the metal salt dissolved therein. This solution is prepared by dissolving sodium hydroxide in water to a concentration of about 25 to 300 grams per liter, preferably 50 to 125 grams per liter.

The metal salt is added as the solution of the soluble salts such as the chloride, nitrate, sulfate, etc. containing a complexing agent, suitable complexing agents include: tartates, citrates, ethylene diamine tetraacetates, etc. The tartates are preferred partly because of this ready availability and low cost.

The amount of complexing agent used depends, of course, on the metal salt being complexed. For example satisfactory results are obtained when the molar ratios of complexing agent to metal is in the range of 0.9 to 1.9.

The second step of the process is the formation of the reactant mixture. The reactant mixture is prepared to contain sodium and silica, generally in the form of a sodium silicate solution, and is added to a source of silica-alumina such as kaolin clay, for example. The relative amounts of the reactants used to prepare the mixture, of course, depends on the silica to alumina ratio in the desired product. When a product having a silica to alumina ratio of about 2.5 to 3 is desired, the slurry is prepared to have the following molar ratios of reactants:

(Where $n$ is the valence of the metal R)

| | |
|---|---|
| $Na_2O/Al_2O_3+R_{2/n}O$ | 1.5–2.5 |
| $SiO_2/Al_2O_3+R_{2/n}O$ | 2.5–4.0 |
| $H_2O/Al_2O_3+R_{2/n}O$ | 3–75 |
| $Na_2O/Al_2O_3+R_{2/n}O$ | 2.5–5 |
| $SiO_2/Al_2O_3+R_{2/n}O$ | 2.5–4 |
| $H_2O/Al_2O_3+R_{2/n}O$ | 75–150 |
| $Na_2O/Al_2O_3+R_{2/n}O$ | 2.5–4 |
| $SiO_2/Al_2O_3+R_{2/n}O$ | 2.5–4 |
| $H_2O/Al_2O_3+R_{2/n}O$ | 150–300 |
| $Na_2O/Al_2O_3+R_{2/n}O$ | 4–6 |
| $SiO_2/Al_2O_3+R_{2/n}O$ | 2.5–5 |
| $H_2O/Al_2O_3+R_{2/n}O$ | 150–400 |

When the desired silica to alumina ratio is about 3 to 7, the solution is prepared to have the following molar ratios of reactants:

| | |
|---|---|
| $Na_2O/Al_2O_3+R_{2/n}O$ | 1.5–2.5 |
| $SiO_2/Al_2O_3+R_{2/n}O$ | 4–8 |
| $H_2O/Al_2O_3+R_{2/n}O$ | 25–35 |
| $Na_2O/Al_2O_3+R_{2/n}O$ | 2.0–5.0 |
| $SiO_2/Al_2O_3+R_{2/n}O$ | 4.0–15 |
| $H_2O/Al_2O_3+R_{2/n}O$ | 35–200 |
| $Na_2O/Al_2O_3+R_{2/n}O$ | 3–4 |
| $SiO_2/Al_2O_3+R_{2/n}O$ | 8–15 |
| $H_2O/Al_2O_3+R_{2/n}O$ | 100–150 |

(Where $n$ is the valence of the metal R).

The next step of the process is the crystallization step. In this step, the reactants are thoroughly mixed. Nucleation centers are added to the mixture to initiate the reaction.

The mixture is then heated to a temperature of about 150 to 250° F., preferably about 200° F. and held at that temperature for a time sufficient to form a crystallite zeolite product. Crystallization times of about one-tenth to 100 hours are normally used. However, crystallization is normally complete in about 0.5 to 75 hours.

After crystallization is complete, the product is separated from the reaction mixture by conventional solid separation techniques, such as filtration, centrifugation, etc., and washed thoroughly.

If desired, the sodium ions in the products may be replaced by other ions such as rare earth ions, ammonium ions, etc., by conventional ion exchange techniques.

The crystals may then be treated by heating at temperatures of 300 to 700° F. to remove water of hydration and produce a substantially anhydrous product which is suitable for adsorbent or catalytic uses.

The zeolite may be used for catalytic conversion such as catalytic cracking, for example, by preparing the zeolite in a fluidizable size range, in which case it is admixed with a diluent such as a conventional silica-alumna cracking catalyst or other diluent materials that have cracking activity. Alternatively, the zeolite may be prepared as a powder and admixed with a precursor of the silica-alumina cracking catalyst.

Many of these catalysts have very good thermal stabilities, as evidenced by the fact that the rare earth exchanged forms, when heated to 1700° F. for a period of about two hours, retain about 95% of the original surface area.

The X-ray diffraction pattern of the products in most cases falls within the pattern shown in Table I:

TABLE I

| d(A.): | $I/I°$ |
|---|---|
| 14.37–14.15 | 100 |
| 8.9–8.67 | 34 |
| 7.56–7.39 | 22 |
| 5.75–5.62 | 40 |
| 4.81–4.72 | 12 |
| 4.46–4.33 | 20 |
| 3.95–3.88 | 10 |
| 3.81–3.74 | 48 |
| 3.34–3.28 | 46 |
| 3.05–3.00 | 11 |
| 2.94–2.89 | 19 |
| 2.88–2.83 | 44 |
| 2.79–2.89 | 18 |
| 2.66–2.61 | 18 |

The novel feature of our process is the relatively rapid crystallization of the zeolite in the presence of complexed metal ions. This results in the incorporation of metal species in the growing crystals of the zeolite. Thus, our process is summarized by:

(a) The use of a complexing agent to assure that the metal ions are available and dispersed throughout the reaction mixture in suitable quantities to prepare the desired product, (b) The use of nucleation centers to initiate the crystallization and assure the relatively rapid crystallization of the zeolite in the presence of the complexed metal ions, and (c) The incorporated metal ions are not ion exchangeable.

The presence of the complexing agent does not hinder zeolite formation and may be beneficial in solubilizing most metal ions. In some cases, especially where the metal ion is a lanthanide, the incorporation of the metal is impossible in the absence of a complexing agent since these ions are quite insoluble and are thus unavailable in the regular zeolite synthesis mixture.

The method of preparing these nucleation centers is not part of this invention. The method is described in detail in U.S. Pat. 3,574,538 issued Apr. 13, 1971 and incorporated herein by reference.

The nucleation centers are colloidal particles having a size between 0.005 and 0.05 microns. They have the composition:

$$0.9 \pm 0.1 Na_2O : Al_2O_3 : 2.3 – 2.7 SiO_2$$

Broadly speaking, the nucleation centers are prepared as follows:

(a) An $Na_2O$-$Al_2O_3$-$SiO_2$ mixture is prepared from sodium aluminate, sodium silicate, sodium hydroxide and water to provide a composition of:

$15 \pm 2 Na_2O$
$1 Al_2O_3$
$14 \pm 2 SiO_2$
$350 \pm 50 H_2O$

The composition is prepared by mixing the ingredients at a temperature of or below about 35° C.

(b) Aging the mixture at a temperature of or below about 25° C. for at least 2 hours.

The nucleation centers made in this way do not exhibit crystalline patterns when examined by standard X-ray diffraction techniques. Although these nucleation centers have one silica-alumino ratio they can be used to form faujasites having any silica:alumina ratio from 2 to about 5. The silica:alumina ratio of the nucleation centers does not have to correspond to the silica:alumina ratio of the desired product.

The nucleation centers are used in an amount equal to 1 to 15, preferably 1 to 10 percent of the reaction mixture.

The primary building block of faujasite is a framework of $SiO_4$ and $Al_2O^-_4$ tetrahedral groups that closely resemble the main structural unit in the mineral sodalite and the ultramarines. For the above reason this building block has been termed the sodalite cage. Each sodalite cage in fajasite is joined to 4 others in a tetrahedral arrangement by the sharing of 6 oxygen ions of each of the 6-element rings in a tetrahedral set. The double 6-membered ring created by the sharing of these oxygen atoms is called the hexagonal prism and the center of the prism, which is a possible cation position, is called the bridge position.

Stacking of the sodalite units in tetrahedral configuration results in the formation of large adsorption cages by the voids which are left unoccupied by the sodalite units. Access to each large adsorption cavity is by means of four tetrahedrally positioned openings consisting of 12-element rings of oxygen ions. There are eight sodalite cages, eight 12-membered rings and 16 hexagonal prisms per unit cell.

The negative charges on the framework due to the aluminum ions are compensated by cations which have been found to occupy one or more of six possible positions all of which lie along the body diagonal of the cubic unit cell and hence have the coordinates $x=y=z$. The first position, which in one nomenclature is called S1, has a positional value of 0.00 and lies in the center of the hexagonal prism. The second and third sites lie within the sodalite cage near the 6-membered ring of the sodalite cage forming the hexagonal prism and the 6-membered ring of the sodalite cage facing the large adsorption cavity, respectively. These two sites are called S2 and S3 and have the values of $x=0.07$ and 0.18. The remaining two sites (S4 and S5) lie within the large pore and have positional values of approximately 0.23 and 0.500. An additional site that has been found to be occupied by water or some oxygen species is U which is in the center of the sodalite cage and has $x=0.125$. Sites S1 and S5 are 16-fold sites (there are 16 of these sites per unit cell), U is an 8-fold site, and S2, S3, and S4 are 32-fold sites.

A structural determination was made on a sodium cerium faujasite material using X-ray powder data. The crystal structure was refined to an R(I) value of 18.4%.

The main features of the structure are that there are 5.41 cerium ions in S3 sites, 13.8 sodium ions in S1' sites ($x=y=z=.0292$) and 32.0 oxygen atoms in S2 sites per unit cell. The S5 sites are occupied by 3.52 sodium atoms per unit cell. The cerium ions are coordinated by three non-framework oxygens from S2 sites at a distance of 2.14 A. In the most probable distribution the sodium ions in S1' sites are coordinated to three framework 03 oxygens at a distance of 2.41 A. and one non-framework oxygen from the S2 site at a distance of 2.10 A.

The whole species which occupies the sodalite cage closely resembles a double hydroxide of the type $$NaOH \cdot Ce(OH)_3.$$

The chemical analyses which gives the unit cell composition as $$26.97\ Na_2O:(2.42\ Ce_2O_3:24.54\ Al_2O_3):143\ SiO_2$$

supports the existence of such a species.

Example 1

A reactant mixture was prepared by mixing a total of 66 grams of metakaolin with 500 grams of sodium silicate solution (containing 28% $SiO_2$ and having a $SiO_2$/$Na_2O$ ratio of 3.3 to 1). A solution of cerium salt was prepared by dissolving 30 grams of cerous nitrate and 15 grams of tartaric acid in 225 grams of water. This solution was added to a solution of sodium hydroxide prepared to contain 25 grams of sodium hydroxide and 100 cc. of water.

The solution containing the sodium hydroxide and cerium nitrate was added to 80 grams of sodium silicate solution. This slurry was added to the slurry of metakaolin and sodium silicate.

The resultant slurry was aged at room temperature for 16 hours, heated to boiling, and nucleation centers were added. The slurry was placed in a stainless steel refluxing vessel and refluxed at a temperature of about 220° F. for a period of about 60 hours. The slurry was cooled, filtered, washed, and dried. The product has a surface area of 920 square meters per gram. The chemical analysis is shown in Table II below:

TABLE II

Analysis in weight percent:
  $Na_2O$ _____ 12.22
  $Al_2O_3$ _____ 18.24
  $SiO_2$ _____ 63.30
  $Ce_2O_3$ _____ 5.59

The zeolite had a unit cell of 24.58 A.

This analytical data shows that the composition of the product was:

$$1.00\ Na_2O:(0.09\ Ce_2O_3+0.91\ Al_2O_3):5.34\ SiO_2$$

Example 2

This examples illustrates the preparation of a sodium lanthano alumino silicate.

A reactant mixture was prepared by mixing a total of 66 grams of metakaolin and 500 grams of sodium silicate solution (containing 28% $SiO_2$ and having an $SiO_2$/$Na_2O$ ratio of 3.3 to 1) with a solution of lanthanum. The lanthanum solution was prepared by dissolving 30 grams of lanthanum nitrate and 20 grams of tartaric acid in 225 ml. of water. This solution was added to a solution of sodium hydroxide and prepared to contain 25 grams of sodium hydroxide and 100 cc. of water.

The solution containing the sodium hydroxide and lanthanum nitrate was added to 88 grams of sodium silicate solution. This slurry was added to the slurry of metakaolin and sodium silicate. The resultant slurry was aged at room temperature for 16 hours, heated to boiling and 40 ml. of a slurry of nucleation centers were added. The slurry was placed in a stainless steel refluxing vessel and refluxed at a temperature of 225° F. for a period of about 60 hours. The slurry was cooled, filtered, washed and dried. The product had a surface area of 800 square meters per gram, and contained 4.4% of $Na_2O_3$.

25 gm. of the lanthanum containing zeolite was ion exchanged for 1 hour in a boiling solution of 50 gm. of ammonium sulfate in 500 ml. of deionized water. The material was separated by filtration, washed and heated at 1000° F. for 2 hours. This material was then ion exchanged again, exactly as before, recovered by filtration and washed. The material showed the X-ray diffraction pattern of a Y-type zeolite and had a surface area of about 750 m.$^2$/gm. The chemical analysis showed

|  | Percent |
|---|---|
| $Na_2O$ | 0.107 |
| $La_2O_3$ | 4.33 |

Example 3

This example illustrates the preparation of our zeolite using magnesium nitrate to furnish magnesium for the reaction.

A solution of 39.4 grams of magnesium nitrate $$(Mg(NO_3)_2 \cdot 6H_2O),$$

100 grams of taretaric acid, and 58.5 grams of sodium hydroxide in 225 grams of deionized water was stirred into 230 grams of a sodium silicate solution (containing 28.9% $SiO_2$ and 8.9% $Na_2O$). This solution was mixed with a solution of sodium hydroxide containing 13.1 grams of sodium hydroxide in 230 grams of deionized water.

A slurry was prepared by adding 43.8 grams of Georgia kaolin clay, that had previously been calcined at 1300° F. for a period of 16 hours, with 140 grams of sodium silicate solution. This slurry was added to the solution of the sodium silicate containing magnesium nitrate. The resultant slurry was heated to boiling and 20 ml. of amorphous nucleation centers were added. The slurry was heated to 100° C. and maintained at that temperature for 27 hours. The crystalline product was separated by filtration, washed, dried and a sample was heated to 1000° F. The surface area was determined and found to be 870 square meters per gram. Analysis of the product was as follows:

Analysis in weight percent:
  Total volatiles _____ 4.3
  $Al_2O_3$ _____ 14.90
  Mg _____ 4.28
  $SiO_2$ _____ 67.84
  $Na_2O$ _____ 9.09

Example 4

This example illustrates the preparation of a nickel containing zeolite and subsequent ion exchange of the zeolite.

A total of 36.4 grams dry basis of a silica-alumina cracking catalyst containing 72% silica and 28% alumina was mixed with a solution of 10 grams of nickel chloride hexahydrate ($NiCl_2 \cdot 6H_2O$) in 100 ml. of deionized water to form an ion exchange complex. The mixture was heated to boiling for a period of about 5 minutes and the product recovered by filtration. This material was then mixed with a solution of 32 grams of sodium hydroxide and 324 ml. of deionized water. The mixture was allowed to stand at room temperature overnight and was then heated to 105° C. A total of 20 ml. of nucleation centers were added to initiate the reaction. The mixture was maintained at 105° C. for a period of 2 hours. The product was recovered by filtration and washed. The product had an X-ray diffraction pattern similar to the pattern of a faujasite type zeolite having a silica alumina ratio of about 2.5 to 3, having a unit cell of 24.80 A. The product had a surface area of 850 sq. meters per gram. A sample of the product was submitted for nickel analysis. The zeolite contained 3.6 wt. percent nickel (as the oxide).

Twenty-five grams of the zeolite was mixed with 94 ml. of a mixed earth chloride solution containing 40 percent by weight $Re_2O_3$ in 375 ml. of deionized water. The exchange is carried out at 100° C. The sample was recovered by filtration, washed substantially free of chloride ions and calcined at 1000° F. for 2 hours. This material was then ion exchange 3 times for 1 hour periods. Twenty-five grams of the zeolite was exchanged with a solution containing 50 grams of ammonium sulphate and 500 ml. of deionized water. The exchange was carried out at 100° C. The product was filtered, washed and dried. The product had a surface area of 700 sq. meters per gram, and contained 2.10 percent nickel (as nickel oxide NiO).

What is claimed is:

1. A process for preparing a synthetic zeolite having the empirical formula, (a) $M_2O$: (b) $Al_2O_3$, (1–b) $R_{2/n}O$: (c) $SiO_2$: (d) $H_2O$ wherein M is sodium and R is a metal selected from the group consisting of magnesium, calcium, barium, yttrium, the rare earths, iron, cobalt, and nickel, $n$ is its valence and (a) has a value of about 1, (b) has a value of 0.5 to 0.99, (c) has a value of 2.5 to 7.0, and (d) has a value of 5 to 9, which comprises, (a) Preparing a sodium hydroxide solution containing a soluble tartrate, citrate, or ethylene diamine tetracetate complex of a metal selected from the group consisting of magnesium, calcium, barium, yttrium, the rare earths, iron, nickel, and cobalt,
   (b) Combining the above solution with sources of $Na_2O$, $Al_2O_3$, and $SiO_2$ to form an aqueous reaction mixture which contains, $Na_2O$, $Al_2O_3$, $SiO_2$, $R_{2/n}O$ and $H_2O$ in the correct molar ratios to form the desired zeolite,
   (c) Adding a slurry of zeolitic nucleation centers having a particle size of about 0.005 to 0.05 microns prepared from a reaction mixture comprising $SiO_2$, $Al_2O_3$, $Na_2O$, and $H_2O$,
   (d) Heating to a temperature of about 150° to 250° F. for about 0.5 to 75 hours to effect crystallization,
   (e) Washing, drying, and recovering the zeolite product.

2. The process according to claim 1 wherein the silica source is sodium silicate, the alumina source is sodium aluminate, the complexing agent is tartaric acid, and the nucleation centers are amorphous.

3. The process according to claim 1 wherein the metal is a rare earth and the complexing agent is tartaric acid.

4. The process according to claim 1 wherein the molar ratios are as follows:

$Na_2O/Al_2O_3+R_{2/n}O$ ---------------------- 1.5–2.5
$SiO_2/Al_2O_3+R_{2/n}O$ ---------------------- 2.5–4.0
$H_2O/Al_2O_3+R_{2/n}O$ ---------------------- 3–75

5. The process according to claim 1 wherein the molar ratios are as follows:

$Na_2O/Al_2O_3+R_{2/n}O$ ---------------------- 2.5–5
$SiO_2/Al_2O_3+R_{2/n}O$ ---------------------- 2.5–4
$H_2O/Al_2O_3+R_{2/n}O$ ---------------------- 75–150

6. The process according to claim 1 wherein the molar ratios are as follows:

$Na_2O/Al_2O_3+R_{2/n}O$ ---------------------- 2.5–4
$SiO_2/Al_2O_3+R_{2/n}O$ ---------------------- 2.5–4
$H_2O/Al_2O_3+R_{2/n}O$ ---------------------- 150–300

7. The process according to claim 1 wherein the molar ratios are as follows:

$Na_2O/Al_2O_3+R_{2/n}O$ ---------------------- 4–6
$SiO_2/Al_2O_3+R_{2/n}O$ ---------------------- 2.5–5
$H_2O/Al_2O_3+R_{2/n}O$ ---------------------- 150–400

8. The process according to claim 1 wherein the molar ratios are as follows:

$Na_2O/Al_2O_3+R_{2/n}O$ ---------------------- 1.5–2.5
$SiO_2/Al_2O_3+R_{2/n}O$ ---------------------- 4–8
$H_2O/Al_2O_3+R_{2/n}O$ ---------------------- 25–35

9. The process according to claim 1 wherein the molar ratios are as follows:

$Na_2O/Al_2O_3+R_{2/n}O$ ---------------------- 2.0–5.0
$SiO_2/Al_2O_3+R_{2/n}O$ ---------------------- 4.0–15
$H_2O/Al_2O_3+R_{2/n}O$ ---------------------- 35–200

References Cited

UNITED STATES PATENTS

| | | | |
|---|---|---|---|
| 3,639,099 | 2/1972 | Elliott et al. | 423—330 |
| 3,373,109 | 3/1968 | Frilette et al. | 252—455 Z |
| 3,574,538 | 4/1971 | McDaniel et al. | 423—329 |
| 3,386,801 | 6/1968 | Kuehl | 423—329 |
| 3,431,219 | 3/1969 | Argaver | 252—455 Z |
| 3,365,272 | 1/1968 | Cornelius et al. | 423—329 |
| 3,322,690 | 5/1967 | Bilisoly | 252—455 Z |

EDWARD J. MEROS, Primary Examiner

U.S. Cl. X.R.

423—118, 329; 252—455 Z